United States Patent
Verot et al.

(10) Patent No.: US 10,107,249 B2
(45) Date of Patent: Oct. 23, 2018

(54) MOTOR VEHICLE STARTER PROVIDED WITH A THERMAL PROTECTION SYSTEM

(71) Applicants: VALEO EQUIPEMENTS ELECTRIQUES MOTEUR, Creteil (FR); JV SVES, Shanghai (CN)

(72) Inventors: Jacques Verot, Lyons (FR); Jiajun Mao, Shanghai (CN)

(73) Assignee: Valeo Equipements Electriques Moteur, Creteil (FR)

( * ) Notice: Subject to any disclaimer, the term of this patent is extended or adjusted under 35 U.S.C. 154(b) by 0 days.

(21) Appl. No.: 15/533,242

(22) PCT Filed: Dec. 4, 2015

(86) PCT No.: PCT/CN2015/096438
§ 371 (c)(1),
(2) Date: Jun. 5, 2017

(87) PCT Pub. No.: WO2016/086895
PCT Pub. Date: Jun. 9, 2016

(65) Prior Publication Data
US 2017/0370341 A1    Dec. 28, 2017

(30) Foreign Application Priority Data
Dec. 5, 2014    (CN) .......................... 2014 1 0742363

(51) Int. Cl.
*F02N 11/04* (2006.01)
*F02N 11/08* (2006.01)
(Continued)

(52) U.S. Cl.
CPC ........... *F02N 11/10* (2013.01); *H01H 37/002* (2013.01); *H01H 85/055* (2013.01); *H02K 11/25* (2016.01); *H02K 11/33* (2016.01)

(58) Field of Classification Search
USPC ......................... 290/38 C; 335/126; 361/139
See application file for complete search history.

(56) References Cited

U.S. PATENT DOCUMENTS

| | | | | |
|---|---|---|---|---|
| 5,134,351 A | * | 7/1992 | Msihid .................. | H02K 23/20 310/148 |
| 6,417,588 B2 | | 7/2002 | Niimi et al. | |

(Continued)

FOREIGN PATENT DOCUMENTS

| | | |
|---|---|---|
| CN | 1598286 A | 3/2005 |
| CN | 102771036 A | 11/2012 |

(Continued)

*Primary Examiner* — Pedro J Cuevas
(74) *Attorney, Agent, or Firm* — Berenato & White, LLC

(57) ABSTRACT

The invention relates mainly to a starter for a heat engine of a motor vehicle comprising:
- at least one electromagnetic contactor comprising a positive output terminal,
- at least one electric motor, the electric motor comprising:
- at least one brush cage (43),
- at least one positive brush (35) mounted in the brush cage (43),
- an electrical path (91) between the positive brush (35) and the positive output terminal (32), and
- at least one thermal protection (96) situated in the electrical path (91), in which the thermal protection is suitable for disconnecting the two elements (93, 95) when the thermal protection has a temperature above a temperature threshold to electrically disconnect the positive output terminal relative to the positive brush (35).

20 Claims, 4 Drawing Sheets

(51) Int. Cl.
*F02N 99/00* (2010.01)
*F02N 11/10* (2006.01)
*H02K 11/33* (2016.01)
*H01H 85/055* (2006.01)
*H01H 37/00* (2006.01)
*H02K 11/25* (2016.01)
*H01H 51/08* (2006.01)

(56) References Cited

U.S. PATENT DOCUMENTS

| | | |
|---|---|---|
| 7,067,934 B2 | 6/2006 | Kitagawa et al. |
| 8,416,551 B2* | 4/2013 | Plaideau ............... F02N 11/087 361/139 |
| 8,446,238 B2* | 5/2013 | Plaideau ............... F02N 11/087 335/126 |
| 8,633,621 B2 | 1/2014 | Muhl et al. |
| 9,590,476 B2 | 3/2017 | Gentil et al. |
| 2011/0273250 A1* | 11/2011 | Plaideau ............... F02N 11/087 335/126 |
| 2011/0273811 A1* | 11/2011 | Plaideau ............... F02N 11/087 361/139 |
| 2014/0245984 A1 | 9/2014 | Seillier et al. |
| 2016/0336832 A1 | 11/2016 | Gentil et al. |

FOREIGN PATENT DOCUMENTS

| | | |
|---|---|---|
| CN | 103858323 A | 6/2014 |
| FR | 2978500 A1 | 2/2013 |
| JP | 2001186710 A | 7/2001 |

\* cited by examiner

MOTOR VEHICLE STARTER PROVIDED WITH A THERMAL PROTECTION SYSTEM

CROSS-REFERENCE TO RELATED APPLICATIONS AND CLAIM TO PRIORITY

This application is a national stage application of International Application No. PCT/CN2015/096438 filed Dec. 4, 2015, which claims priority to Chinese Patent Application No. 201410742363.2 filed Dec. 5, 2014, the disclosures of which are incorporated herein by reference and to which priority is claimed.

FIELD OF THE INVENTION

The present invention relates to a motor vehicle starter provided with a thermal protection system. The invention is particularly advantageously, but not exclusively, applicable to the starters of systems for automatically stopping and restarting the heat engine, called "stop and start" system.

BACKGROUND OF THE INVENTION

As is known per se, the starters comprise a means of protection against the overcurrents taking the form of one or more electrical fuses and/or one or more circuit breakers. FIG. 1 thus shows an exemplary starter motor 1 comprising a fuse 2 mounted in series between a power supply terminal 3 of the electric machine 1 and of the windings 4.1-4.4 of the stator of said motor.

The fuse is intended to melt to cut the electrical power supply to the motor when it is passed through by a maximum predetermined current. This makes it possible to avoid damaging the starter or its environment because of the heat produced by an overcurrent. Such an overcurrent notably occurs in the case where the rotor of the motor is blocked in rotation.

When the machine is operating off-load or at low load (that is to say that it is operating approximately between 0 and 25% of the rated load), the off-load rotation speed of the rotor also leads to an overheating of the electric machine likely to damage the starter over time. This overheating, due notably to the mechanical friction between the brushes 6.1-6.4 and the collector, occurs for example in an overspeed phase when the pinion of the starter driven by the heat engine rotates more rapidly than the shaft driven by the rotor of the starter. However, in this case, the current passing through the fuse may be too low to cause the fuse 2 to melt, even over a long time.

The document FR140573 filed on 23th January by Valeo, describes a compact thermal protection system 5 that makes it possible to cut the electrical power supply of the motor in the abovementioned two cases (in case of blocking and in case of operation at low load). More specifically, this system is configured in such a way that, in the case of overheating, an overmoulded part on the plate of the brush-holder is deformed, such that the brush cages of positive polarity subject to the action of springs enter into contact with the plate linked to the terminal of negative polarity. A short circuit is thus created, causing the fuse of the starter to open.

SUMMARY OF THE INVENTION

The invention aims to improve the thermal protection of the starter in the case of a low level of charge of the battery of the vehicle likely to make it difficult for the fuse to open, even in the event of a short circuit.

To this end, the invention proposes a starter for a heat engine of a motor vehicle comprising:
  at least one electromagnetic contactor comprising a positive output terminal,
  at least one electric motor, said electric motor comprising:
    at least one brush cage,
    at least one positive brush mounted in said brush cage,
    an electrical path between said positive brush and the positive output terminal, the electrical path comprising at least one two electrical conductor elements and
    at least one thermal protection situated in said electrical path, in which said thermal protection is suitable for disconnecting said two elements when the thermal protection has a temperature above a temperature threshold to electrically disconnect said positive output terminal relative to said positive brush.

The invention thus makes it possible to cut the power supply circuit for the electric motor in a way which depends mainly on the level of temperature in the starter. There is thus an assurance that the power supply circuit will be cut, regardless of the level of charge of the battery of the vehicle.

According to one embodiment, said temperature threshold corresponds to a starter anomaly provoking an overheating likely to damage the vehicle.

According to one embodiment, said thermal protection is arranged in said electric motor in such a way that a main factor making it possible to reach the temperature threshold in the case of an anomaly is a transmission by thermal conduction and/or by convection of a heat corresponding to an operating anomaly to said thermal protection.

According to one embodiment, comprising at least one a heat element which is in the said electrical path and wherein the heat element heats the thermal protection and in that said thermal protection and said heat element are two distinct elements.

According to one embodiment, the heat element is a fuse suitable for melting above a predetermined current corresponding an overload current which are above a rated current.

According one embodiment, the heat element is formed to, when the current through above a predetermined current corresponding to an overload current which are above a rated current, heats, directly by conduction or indirectly by others conductor elements of the electrical path, the thermal protection to electrically disconnect said positive output terminal relative to said positive brush when the temperature of the thermal protection is above a temperature threshold.

According to one embodiment, at least one other of the elements of said electrical path is a fuse suitable for melting above a predetermined current and in that said thermal protection and said fuse are two distinct elements.

According to one embodiment, in the case of a short circuit, said fuse is suitable for acting by melting to electrically disconnect said positive output terminal relative to said positive brush.

According to one embodiment, said fuse consists of a positive brush braid.

According to one embodiment, said thermal protection comprises a low-melting-point weld linking together two elements of said electrical path, said weld being suitable for melting above said temperature threshold, in which, in an operating state of the starter, the weld is able to be in a solid state to link said connector to said conductor and, in the case of an anomaly on the starter, said weld is able to change to the molten state to enable said thermal protection to separate said two elements from said electrical path.

According to one embodiment, one of the elements of said electrical path is a conductor and another element of said electrical path is a connector electrically linking said conductor to the at least one positive brush, these two elements being linked together by said weld.

According to one embodiment, said electrical protection comprises an elastic member suitable for exerting a pressure on one of the elements of said electrical path linked together by said weld. The disconnection of the two elements in the event of overheating is thus facilitated.

According to one embodiment, said thermal protection comprises an abutment suitable for retaining one of the two elements of said electrical path following the melting of the weld. The positioning of the freely-moving element is thus controlled following the melting of the weld.

According to one embodiment, said thermal protection comprises a guiding device for guiding the displacement of one of the two elements of said electrical path following the melting of the weld.

According to one embodiment, said conductor consists of an elongate terminal passing through a grommet mounted on said carcass.

According to one embodiment, said elastic member, said abutment, and said guiding device are of the same material as said grommet.

According to one embodiment, a portion of said connector linked to said conductor through said weld is omega-shaped.

According to one embodiment, an insulating layer arranged to electrically insulate said brush cage relative to a support plate is deformable from another temperature threshold, and an elastic means stressing said positive brush against a contact blade of a collector is suitable for establishing a contact between said brush cage and said support plate following a deformation of said deformable insulating layer.

BRIEF DESCRIPTION OF THE DRAWINGS

The invention will be better understood on reading the following description and its accompanying figures. These figures are given purely by way of illustration but are in no way limiting on the invention.

DETAILED DESCRIPTION OF THE PREFERRED EMBODIMENT(S)

Elements that are identical, similar or analogous retain the same reference from one figure to another.

Figure 1:
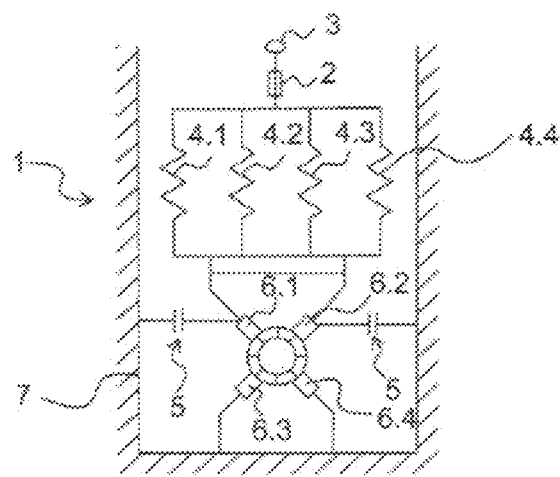
FIG. 1, already described, shows a schematic diagram of an electric starter motor of a motor vehicle provided with a thermal protection system.
Figure 2:
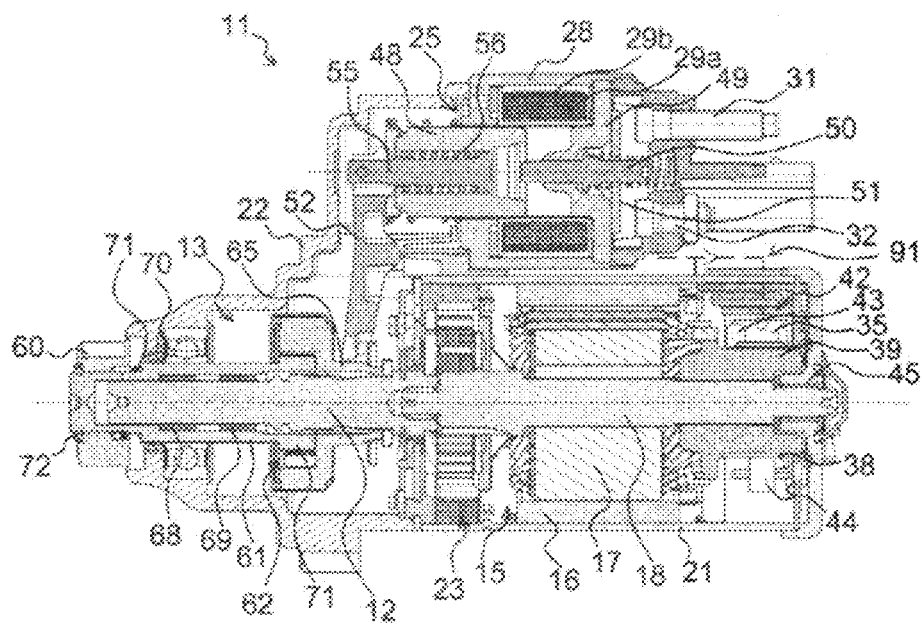
FIG. 2 is a view in longitudinal cross section of a motor vehicle heat engine starter according to the present invention.

Referring to FIG. 2, the starter 11 according to the invention notably comprises a drive shaft 12, a starter drive assembly 13 mounted on the drive shaft 12, and an electric motor 15 consisting of an inducting stator 16 and an induced rotor 17 secured to a shaft 18. The motor 15 comprises a carcass 21 mounted on a support 22 of the starter 11 intended to be fixed onto a fixed part of the motor vehicle.

A speed reducer 23 with planetary train-type gears is preferably inserted between a rear end of the drive shaft 12 and the shaft 18 of the electric motor 15.

The starter 11 also comprises an electromagnetic contactor 25 extending parallel to the electric motor 15 by being located radially above the latter. The contactor 25 has a metal tank 28 equipped with a set of excitation coils 29a, 29b. Terminals 31, 32 are configured to each form a fixed contact inside the tank 28. One of the terminals 31 is intended to be linked to the positive terminal of the battery of the vehicle. The other terminal 32, called positive output terminal, is connected to the input of the inductive winding of the stator 16 and to the brushes 35 of positive polarity, as is explained in more detail hereinbelow.

These brushes 35 rub on conductive blades 38 of a collector 39 to power the rotor winding. The brushes 35 belong to a brush-holder 42 equipped with cages 43 for guiding and receiving the brushes 35. These brushes 35 are stressed towards the conductive blades 38 by elastic means 44 of spring type. A bearing 45 of the rear flange serves as a rotation mounting for one end of the shaft 18 of the electric motor 15.

As is known, upon the excitation of the inrush coil 29a, a moving core 48 is attracted by magnetic attraction towards a fixed core 49 of the contactor 25 in order, on the one hand, to act after taking up a play on a rod 50 bearing a moving contact 51 to provoke the closure of the contacts 31, 32 of the contactor 25 and power the electric motor 15, and, on the other hand, to actuate a control lever 52 acting on the starter drive assembly 13. The top end of the lever 52 is mounted in a known manner with articulation on a moving rod 55 linked elastically to the moving core 48 via a spring 56, called tooth-to-tooth spring, housed in the moving core 48.

The starter drive assembly 13 can thus change from a rest position in which a drive pinion 60 is situated away from the starting crown ring of the heat engine to an active position in which the drive pinion 60 cooperates with the starting crown ring of the heat engine. The drive shaft 12 then transmits a torque from the electric motor 15 to the drive pinion 60 through a pinion body 61, via a free wheel device 62. Following the deactivation of the contactor 25, the starter drive assembly 13 changes back from its active position to its rest position.

When the starter drive assembly 13 is in an active position, the pinion body 61 is driven, via the free wheel device 62, by a catch 65. To this end, the pinion body 61 is mounted on the drive shaft via two annular bushings 68, 69.

The pinion body 61 is mounted to rotate in a front bearing 70 of the support 22. This bearing 70 consists, by way of example, of a ball bearing or, as a variant, of a needle bearing, or a plain bearing.

The free wheel device 62 is, for example, of the type with rollers, but could as a variant be replaced by a conical clutch device or a clutch provided with a plurality of friction discs, as described in the document FR2978500.

As is known, the catch 65 is provided internally with helical splines in a complementary manner with outer helical teeth borne by the drive shaft 12. The starter drive assembly 13 is thus driven by a helical movement when it is displaced by the lever 52 to come into the active position, via the pinion 60, engaged with the starting crown ring of the heat engine.

The drive pinion 60 being linked in rotation and mounted to slide axially relative to the body of the pinion 61 via sets of grooves of complementary form, a spring 71 stresses the drive pinion 60 towards an axial abutment 72 formed for example by a circlip. The spring 71 will be compressed in such a way that the pinion 60 recoils in the event of impact from the pinion 60 with the starter crown ring.

Figure 3:
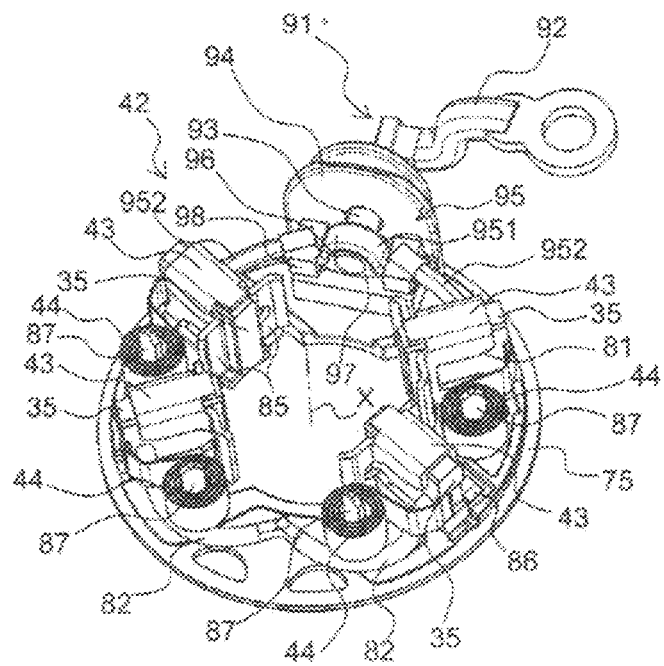
FIG. 3 shows a perspective view of a brush-holder belonging to the starter of FIG. 2.
Figure 4:
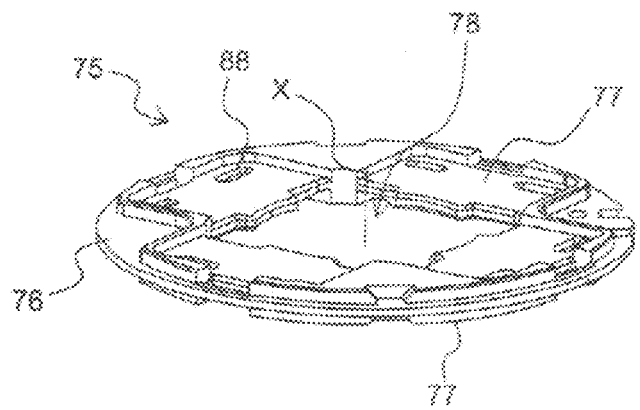
FIG. 4 is a perspective representation of the support plate of the brush holder of FIG. 3.

FIG. 3 is a detailed view of the brush-holder 42 of axis X comprising a substantially annular support plate 75 on which is fixed the set of cages 43 each being used to house a brush 35. As can be clearly seen in FIG. 4, the support plate 75 is a single-piece part comprising a metal plate 76 and overmoulded layers 77 produced on either side of the metal plate 76. The overmoulded layers 77 are produced using a plastic material that ensures a good electrical insulation. The overmoulded layers 77 at least partly protect the brush support face and the opposite face. The overmoulded layers 77 are sensitive to heat and deformable above a temperature threshold T1. The temperature threshold T1 corresponds to a temperature above which the starter 11 and/or its environment would be likely to be damaged.

Different plastic materials can be used depending on the applications and the stresses which are imposed thereon. Typically, the plastic material used for the overmoulded layers 77 is a thermoplastic material such as a polyamide PA4.6 or PA6.6 or a polypropylene PPS charged with glass fibres between 40 and 50%. Thermosetting materials can also be considered. The metal plate 76 is typically obtained by die-stamping from a steel to be cut such as FePO5 for example.

The support plate 75 and the cages 43 that it bears are fixed onto the flange forming the rear bearing 45 for the shaft 18 of the electric motor 15. Furthermore, the central part of the plate 75 comprises an opening 78 through which the assembly that it forms with the cages 43 and the brushes 35 is mounted around the shaft 18 of the electric motor 15.

Each brush 35 is mounted to slide inside a cage 43, which is open on the side of the axis X to allow electrical contact between the brushes 35 and the blades 38 of the collector 39. More specifically, each cage 43 is produced by folding a sheet metal plate whose end branches are fixed onto the plate 75. One of the lateral walls has a cut-out 81, visible in FIG. 3, to allow for the passage of the arm of the corresponding spring 44. On the side of the face emerging on the side of the collector 39, each cage 43 will be able to comprise flaps 85 extending on either side of the brush 35 to prevent the dust generated by the friction of the brushes 35 with the blades 38 from affecting the operation of the brush-holder 42.

Each cage 43 further comprises a system for fixing to the plate 75. Each fixing system is formed for example by tabs 86 cooperating with openings 88 formed in the plate 75. Alternatively, the cages 43 are fixed onto the plate 75 by means of rivets.

Moreover, a spiral spring 44 associated with each cage 43 radially stresses the corresponding brush 35 towards the contact blades 38 of the collector 39. Each spring 44 comprises a wound part formed by a plurality of turns, and an arm intended to bear against the rear face of the corresponding brush 35. Each spring 44 is in this case mounted around a holding system 87 formed by a pin extending axially relative to the axis X.

The brushes 35 of positive polarity are electrically linked to the positive output terminal 32 of the contactor 25 via an electrical path 91. This electrical path 91 is thus formed by the set of elements conducting the current between the output terminal 32 and the brushes 35 of positive polarity. As can be seen in FIG. 3, this electrical path 91 is formed notably by the following elements:

a first conductor 92 providing an electrical link between the positive output terminal 32 of the contactor 25 and a second conductor 93, said second conductor 93 consisting of a rigid elongate terminal passing through a grommet 94 cooperating with the carcass 21 to hermetically insulate the brush-holder 42 from the outside environment, and a connector 95, called inter-brush connector, providing, in the brush-holder 42, an electrical link between the terminal 93 and the braids 82 of the brushes 35 of positive polarity. This connector 95 here comprises an omega-shaped portion 951 to which are welded two branches 952, each of the branches 952 being electrically linked to the braids 82 of the brushes 35 of positive polarity, and the braids 82 of the brushes of positive polarity providing an electrical link between the connector 95 and the brushes 35 of positive polarity.

Furthermore, one of the elements situated in the electrical path 91 is a fuse suitable for melting above a predetermined current, for example of the order of 100 amperes. Thus, in the event of a short circuit generating such a current, the fuse acts by melting to electrically disconnect the positive output terminal 32 relative to the positive brush 35. In this case, two fuses are used, each consisting of a flexible braid 82 of a positive brush 35 made of copper or of copper alloy. As a variant, it would be possible to use dedicated fuses inserted into the electrical path 91.

Figure 5:
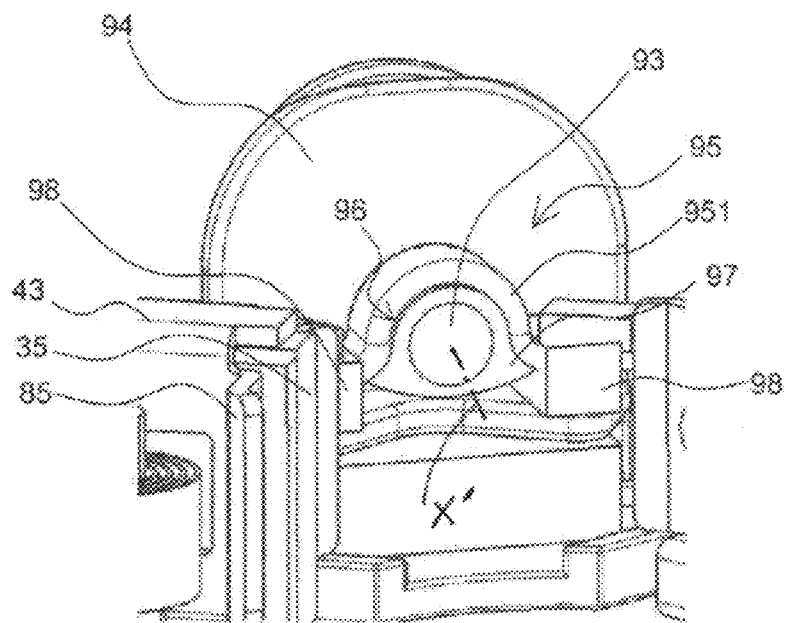
FIG. 5 is a detailed perspective view of an exemplary embodiment of the thermal protection implemented in the motor vehicle starter according to the present invention.

Moreover, a thermal protection 96 separate from the fuse is situated in the electrical path 91. In this case, as can be seen in FIGS. 3 and 5, the thermal protection 96 comprises a low-melting-point weld 97 linking the connector 95 to the terminal 93, via the portion 951.

The weld 97 is thus suitable for melting above a temperature threshold T2 corresponding to an anomaly in the starter provoking an overheating likely to damage the vehicle. This temperature threshold T2 is below 300° C. and, for example, lies between 230° C. and 260° C. The weld 97 is preferably formed by an alloy of copper and tin, the proportion of copper being less than 10%. The proportion of copper is, for example, of the order of 2%.

The thermal protection 96 is arranged in the electric motor 15 in such a way that a main factor making it possible to reach the temperature threshold T2 in the case of an anomaly is a transmission by thermal conduction and/or by convection of a heat corresponding to the operating anomaly to the thermal protection 96, and not a current passing through the thermal protection 96. This heat will, for example, be able to be generated notably by dust due to the wear of the brushes 35, the malfunctioning of a mechanical part, or an electrical malfunction in the starter.

The thermal protection 96 is in this case situated in proximity to the rear bearing inside the internal volume delimited by the carcass 21. As a variant, the positioning will be able to be adapted such that the thermal protection will be able to be situated outside the carcass 21. In all cases, the thermal protection 96 is positioned in proximity to the elements likely to generate a significant heat in the case of an anomaly for a transmission by convection and/or by conduction to the thermal protection 96.

Furthermore, it should be noted that the weld of the thermal protection 96 does not necessarily have the highest electrical resistance of the elements of the electrical path 91.

Preferably, the thermal protection 96 even has a low electrical resistance in order for the current to participate as little as possible to its overheating.

Furthermore, in certain cases, the melting point of the weld 96 will be able to be less than all the melting temperatures of the different elements of the electrical path 91.

On the other hand, in other cases, the melting point of the weld 96 is greater than the melting point of the fuse here consisting of one or more braids 82. However, because of the previously indicated arrangement of the thermal protection 96, the thermal protection 96 will be able to have a higher temperature than the fuse in the case of an operating anomaly, which results in the melting of the thermal protection 96 before that of the fuse.

Preferably, the thermal protection 96 further comprises an elastic member 98 prestressed axially between the brush-holder 42 (here the plate 75 of the brush-holder 42) and the connector 95. This elastic member 98 is suitable for exerting an axial pressure on the connector 95. In this case, the elastic member 98 consists of two terminals of the same material as the grommet 94 prestressed radially relative to the axis X' of the terminal 93 between the grommet and each end of the portion 951 of the connector 95. When the weld 97 is in the solid state, it links the connector 95 to the terminal 93, and enables the connector 95 to withstand the axial force applied by the prestressed elastic member 98. On the other hand, when the weld 97 then changes to the molten state, such that the connector 95, which is no longer retained by the weld 97, is separated from the terminal 93 by virtue of the force exerted by the elastic member 98.

Figure 6A:
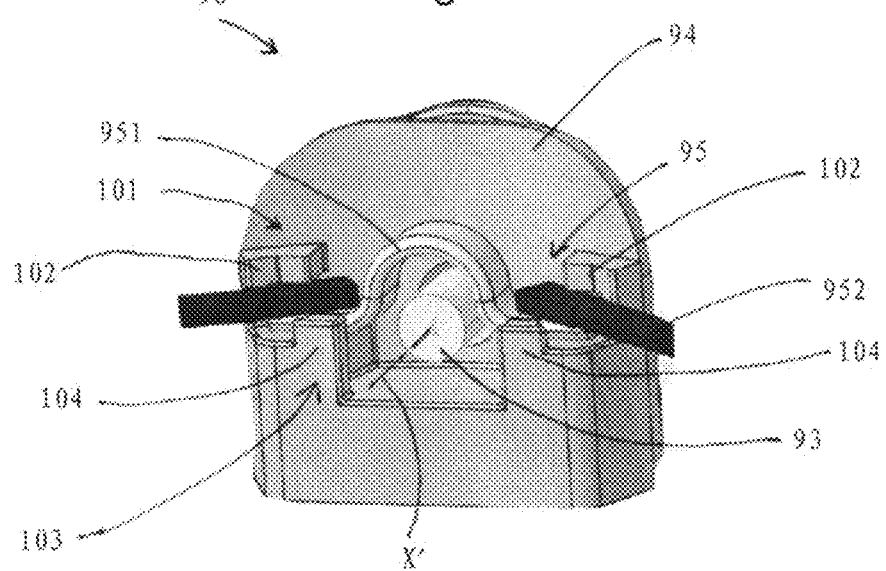
FIGS. 6a and 6b are perspective views illustrating variant embodiments of the thermal protection according to the present invention without the weld.
Figure 6B:
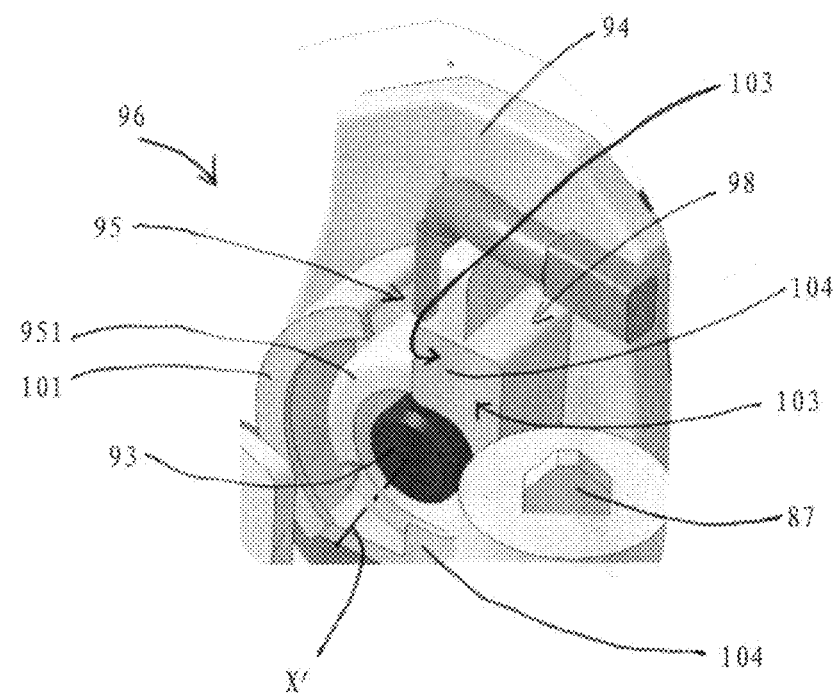

As can be seen in FIGS. 6a and 6b, the thermal protection 96 preferably comprises an abutment 101 suitable for retaining the portion 951 of the connector following the melting of the weld 97. The final positioning of the portion 951 is thus controlled after its displacement caused by the elastic member 98. In the exemplary embodiment of FIG. 6a, the abutment 101 is formed by two tabs 102 positioned facing the ends of the omega-shaped portion 951. In the exemplary embodiment shown in FIG. 6b, the abutment 101 is in the form of a ring portion situated facing the portion 951.

The thermal protection 96 further comprises a guiding device 103 for guiding the displacement of the portion 951 following the melting of the weld. This guiding device 103 is formed by two guides 104 situated on either side of the terminal 93 ensuring a radial guidance relative to the axis X' of the portion 951 towards the abutment 101. These guides 104 can also ensure an axial guidance of the portion 951 relative to the axis X' of the terminal 93 in order to prevent the portion 951 from falling towards the interior of the brush-holder 42, which could cause short-circuit problems.

In the embodiment of FIG. 6b, the omega-shaped portion 951 of the connector 95 has been turned by 90° relative to its positioning in the embodiment of FIG. 6a. Obviously, a positioning according to a rotation of 90° according to an opposite or 180° angle can also be envisaged.

Moreover, the brushes 35 of negative polarity intended for the current return are electrically linked to the ground of the machine by means of their respective braid 82 welded to the plate 76. The brushes 35 of positive polarity and their corresponding cage 43 are electrically insulated from the negative polarity for correct operation of the starter 11. This insulation is obtained by the overmoulded layers 77.

The activation of the thermal protection 96 in the event of malfunctioning of the starter 11 is described hereinbelow.

In the case of a short circuit occurring in the electric motor of the starter when the battery of the vehicle has a significant charge level, the two fuse-forming brush braids 82 will melt one after the other. In effect, because of their different resistances (it is in fact impossible to produce braids 82 that have exactly identical resistances), one of the braids 82 melts before the other in the event of a short circuit. One of the braids having melted, the other will melt immediately after because of the considerably increased current passing through the brush 35 to which the second braid is linked.

In the case where the charge level of the battery of the vehicle is high and a malfunction occurs with does not necessarily generate a short circuit, notably such as an overheating caused, for example, by an off-load operation of the starter 11 for a long period, the temperature threshold T1 is reached. The overmoulded insulating layers 77 of the plate 75 are then deformed, such that the force exerted by the spring 44 onto the holding system 87 generates a pivoting of the cages 43 of positive polarity which then enter into contact with the metal plate 76 to establish a short circuit. This short circuit generates a considerable increase in the current passing through the machine, which has the effect of melting the braids 82 and therefore cuts the power supply to the electric motor.

Figure 7:
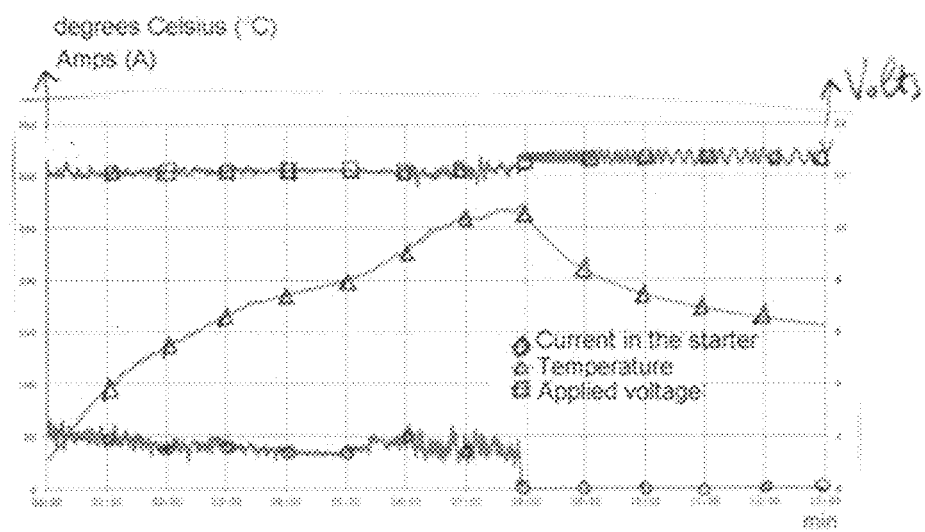
FIG. 7 is a graph showing the trend, as a function of time, of the temperature of the starter, of the starter power supply voltage, and of the current circulating in the collector upon the activation of the thermal protection.

In the case illustrated by FIG. 7 where the charge level of the battery of the vehicle is low and an overheating occurs that is caused, for example, by the off-load operation of the starter 11 for a long period, the temperature increases in the starter even though the current does not reach the threshold current (here 100 A) allowing for the melting of the fuse-forming positive brush braids. Then, when the temperature reaches the melting point of the weld 97 which is here slightly greater than 250 degrees Celsius, the connector 95, which is no longer retained by the weld 97, is separated from the terminal 93 by virtue of the force exerted by the elastic member 98. This has the effect of electrically disconnecting the output terminal 32 relative to the brushes of positive polarity 35. The starter 11 then switches from the operating state to an out-of-service state of the starter 11 in which the motor 15 is no longer powered because of the break produced in the electrical path 91. It will be noted that, in its displacement, the connector 95 is guided by the guiding device 103 towards the abutment 101 which then stops its displacement to prevent the latter from being able to cause short circuits.

There are thus two thermal protection systems for the starter 11 which will be able to act in different starter operating conditions. As a variant, it would be possible to dispense with the thermal protection system based on the use of the overmoulded plate generating the short circuit, only the thermal protection 96 being used with the fuses formed here by the braids 82 of the positive brushes.

A person skilled in the art will obviously be able to modify the configuration of the brush-holder 42 described previously without departing from the framework of the invention.

Thus, as a variant, the thermal protection 96 is situated between two other elements of the electrical path 91, such as, for example, between the first 92 and the second 93 conductors.

As a variant, the electrical path 91 has no second conductor 93, the first conductor 92 passing inside the grommet 94 and being directly linked to the connector 95.

As a variant, the elastic member 98 exerts a radial force on the connector 95 by being prestressed radially relative to the axis X for example between the connector 95 and the carcass 21.

As a variant, the thermal protection 96 has no elastic member 98, the separation of the two elements 93, 95 following the melting of the weld 97 being obtained solely by gravity.

Alternatively, the plate 75 is electrically linked to the positive polarity. The spiral spring 44 can also be replaced by a cylindrical spring bearing on the cap to push the corresponding brush 35 against the blades 38 of the collector 39.

As a variant, the brush-holder 42 comprises more than four brushes 35, each brush 35 being able, for example, to be associated with another brush 35 positioned on the opposite side of the plate 75.

The brush-holder 42 is, here, a machine brush-holder of a motor vehicle starter. As a variant, the brush-holder could also belong to an alternator or to an alternator-starter.

The invention claimed is:

1. Starter (11) for a heat engine of a motor vehicle comprising:
    at least one electromagnetic contactor (25) comprising a positive output terminal (32),
    at least one electric motor (15), said electric motor (15) comprising:
        at least one brush cage (43),
        at least one positive brush (35) mounted in said brush cage (43),
    an electrical path (91) between said positive brush (35) and the positive output terminal (32), the electrical path comprising at least one two electrical conductor elements and
    at least one thermal protection (96) situated in said electrical path (91), in which said thermal protection is suitable for disconnecting said two elements (93, 95) when the thermal protection has a temperature above a temperature threshold (T2) to electrically disconnect said positive output terminal (32) relative to said positive brush (35).

2. Starter according to claim 1, wherein said temperature threshold (T2) corresponds to a starter anomaly provoking an overheating likely to damage the vehicle.

3. Starter according to claim 1, wherein said thermal protection (96) is arranged in said electric motor (15) in such a way that a main factor making it possible to reach the temperature threshold (T2) in the case of an anomaly is a transmission by thermal conduction and/or by convection of a heat corresponding to an operating anomaly to said thermal protection (96).

4. Starter according to claim 1 comprising at least one a heat element which is in said electrical path (91) wherein the heat element heats the thermal protection and wherein said thermal protection (96) and said element are two distinct elements.

5. Starter according to claim 4, wherein the heat element is a fuse (82) suitable for melting above a predetermined current corresponding an overload current which are above a rated current.

6. Starter according to claim 4, wherein when the current through the heat element is above a predetermined current corresponding to an overload current which are above a rated current, the heat element heats, directly by conduction or indirectly by others conductor elements of the electrical path, the thermal protection to electrically disconnect said positive output terminal (32) relative to said positive brush (35) when the temperature of the thermal protection is above a temperature threshold (T2).

7. Starter according to claim 4, wherein, in the case of a short circuit, said heat element is a fuse and is suitable for acting by melting to electrically disconnect said positive output terminal (32) relative to said positive brush (35).

8. Starter according to claim 4, wherein said fuse consists of a positive brush (35) braid (82).

9. Starter according to claim 1, wherein said thermal protection (96) comprises a low-melting-point weld (97) linking together two elements (95, 93) of said electric path (91), said weld (97) being suitable for melting above said temperature threshold (T2), in which, in an operating state of the starter, the weld (97) is able to be in a solid state to link said connector (95) to said conductor (93) and, in the case of an anomaly on the starter, said weld (97) is able to change to the molten state to enable said thermal protection (96) to separate said two elements (93, 95) from the electrical path (91).

10. Starter according to claim 9, wherein one of the elements of said electrical path (91) is a conductor (93) and another element of said electrical path (91) is a connector (95) electrically linking said conductor (93) to the at least one positive brush (35), these two elements being linked together by said weld.

11. Starter according to claim 9, wherein said electrical protection (96) comprises an elastic member (98) suitable for exerting a pressure on one of the elements (93, 95) of said electrical path (91) linked together by said weld.

12. Starter according to claim 9, wherein said thermal protection (96) comprises an abutment (101) suitable for retaining one of the two elements of said electrical path (91) following the melting of the weld.

13. Starter according to claim 9, wherein said thermal protection (96) comprises a guiding device (103) for guiding the displacement of one of the two elements of said electrical path (91) following the melting of the weld.

14. Starter according to claim 10, wherein the electrical motor comprises a field frame (21) and in which said conductor (93) consists of an elongate terminal passing through a grommet (94) mounted on said field frame (21).

15. Starter according to claim 11, wherein said thermal protection (96) comprises an abutment (101) suitable for retaining one of the two elements of said electrical path (91) following the melting of the weld, in that said thermal protection (96) comprises a guiding device (103) for guiding the displacement of one of the two elements of said electrical path (91) following the melting of the weld, and in that the electrical motor comprises a field frame (21) and in which said conductor (93) consists of an elongate terminal passing through a grommet (94) mounted on said field frame (21);
    wherein said elastic member (98), said abutment (101), and said guiding device (103) are of the same material as said grommet (94).

16. Starter according to claim 10, wherein a portion (951) of said connector (95) linked to said conductor (93) through said weld (97) is omega-shaped.

17. Starter according to claim 1, wherein an insulating layer (77) arranged to electrically insulate said brush cage (43) relative to a support plate (75) is deformable from another temperature threshold (T1), and
    an elastic means (44) stressing said positive brush (35) against a contact blade (38) of a collector (39) is suitable for establishing a contact between said brush cage (43) and said support plate (75) following a deformation of said deformable insulating layer (77).

18. Starter according to claim 2, wherein said thermal protection (96) is arranged in said electric motor (15) in such a way that a main factor making it possible to reach the temperature threshold (T2) in the case of an anomaly is a transmission by thermal conduction and/or by convection of a heat corresponding to an operating anomaly to said thermal protection (96).

19. Starter according to claim 2 comprising at least one a heat element which is in said electrical path (91) wherein the heat element heats the thermal protection and wherein said thermal protection (96) and said element are two distinct elements.

20. Starter according to claim 3 comprising at least one a heat element which is in said electrical path (91) wherein the heat element heats the thermal protection and wherein said thermal protection (96) and said element are two distinct elements.

* * * * *